(12) United States Patent
Grieve et al.

(10) Patent No.: US 7,931,707 B2
(45) Date of Patent: Apr. 26, 2011

(54) REGENERABLE METHOD AND SYSTEM FOR DESULFURIZING REFORMATE

(75) Inventors: Malcolm James Grieve, Fairport, NY (US); Jeffrey G. Weissman, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 1452 days.

(21) Appl. No.: 11/110,043

(22) Filed: Apr. 20, 2005

(65) Prior Publication Data

US 2006/0240296 A1    Oct. 26, 2006

(51) Int. Cl.
| | |
|---|---|
| B01J 7/00 | (2006.01) |
| B01J 10/00 | (2006.01) |
| C01B 3/36 | (2006.01) |
| C10J 3/46 | (2006.01) |
| B01D 50/00 | (2006.01) |
| B01D 53/34 | (2006.01) |

(52) U.S. Cl. .......... 48/61; 48/197 R; 422/129; 422/168; 422/177; 422/180

(58) Field of Classification Search .......... 48/61, 197 R; 422/129, 168, 177, 180
See application file for complete search history.

(56) References Cited

U.S. PATENT DOCUMENTS

| | | | | |
|---|---|---|---|---|
| 3,072,457 | A | * | 1/1963 | Bloch .............................. 60/288 |
| 5,853,459 | A | * | 12/1998 | Kuwamoto et al. .............. 95/273 |
| 2002/0136936 | A1 | * | 9/2002 | Grieve et al. .................... 429/17 |
| 2003/0162067 | A1 | * | 8/2003 | McElroy .......................... 429/26 |
| 2004/0023086 | A1 | * | 2/2004 | Su et al. .......................... 429/17 |
| 2004/0035055 | A1 | * | 2/2004 | Zhu et al. ..................... 48/127.9 |

FOREIGN PATENT DOCUMENTS

| | | | |
|---|---|---|---|
| GB | 2163363 A | * | 2/1986 |
| JP | 11159322 A | * | 6/1999 |

OTHER PUBLICATIONS

JPO Machine Translation of JP11-159322 (translated Jun. 24, 2009).*

* cited by examiner

Primary Examiner — Alexa D Neckel
Assistant Examiner — Matthew J Merkling
(74) Attorney, Agent, or Firm — Thomas N. Twomey

(57) ABSTRACT

A system for removing sulfur from a continuous reformate stream feeding a fuel cell stack. First and second sulfur traps are disposed in parallel between a hydrocarbon reformer and the fuel cell stack. The ends of the sulfur traps are connected to conventional four-way valves such that either trap may be selected for trapping sulfur from the reformate stream, while the other trap is undergoing regeneration by backflushing the accumulated adsorbed sulfur deposits. Thus, the sulfur traps may be used and stripped alternately, permitting continuous supply of desulfurized reformate to the fuel cell assembly. In a currently preferred embodiment, the hot cathode air exhaust is used to assist in stripping the out-of-service trap. In an alternative embodiment, two reformers are provided and the reformers are alternately regenerated along with their respective traps.

1 Claim, 2 Drawing Sheets

REGENERABLE METHOD AND SYSTEM FOR DESULFURIZING REFORMATE

This invention was made with United States Government support under Government Contract/Purchase Order No. DE-FC26-02NT41246 awarded by DOE. The government has certain rights in this invention.

TECHNICAL FIELD

The present invention relates to hydrocarbon reforming for supplying hydrogen-containing reformate fuels to fuel cells; more particularly, a system for removing sulfur from a reformate fuel stream; and most particularly, to an improved arrangement for continuously desulfurizing a reformate fuel stream.

BACKGROUND OF THE INVENTION

Fuel cells for combining hydrogen and oxygen to produce electricity are well known. A well known class of fuel cells, referred to in the art as "solid-oxide" fuel cells ("SOFC"), includes a solid-oxide electrolyte layer through which oxygen anions migrate from a cathode to combine with hydrogen, forming water at the anode. In an SOFC, electrons flow through an external circuit between the electrodes, doing electrical work in a load in the circuit.

In the prior art, an SOFC is readily fueled by "reformate" gas, which is the effluent from a catalytic hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the hydrocarbon, resulting ultimately in water and carbon dioxide. Both reactions are preferably carried out at relatively high temperatures, for example, in the range of 700° C. to 1000° C. An SOFC can use fuel gas containing CO with the $H_2$, the CO being oxidized to $CO_2$.

The long term successful operation of an SOFC depends primarily on maintaining structural and chemical stability of the fuel cell components during steady state conditions, as well as transient operating conditions such as cold startups and emergency shut downs. Three types of reformer technologies are typically employed in conjunction with an SOFC (steam reformers, dry reformers, and partial oxidation reformers) to convert hydrocarbon fuel to hydrogen using water, carbon dioxide, and oxygen, respectively, with byproducts including carbon dioxide and carbon monoxide, accordingly.

Known hydrocarbon fuels for use in a reformer are, for example, gasoline, diesel, JP-8, Jet-A, and natural gas. A serious problem in the use of such fuels can be the presence of sulfur and sulfurous compounds. Ultra-low sulfur road fuels, being introduced in Europe and North America, have low levels of sulfur, with limits in the range of 10 to 50 parts per million (ppm) by weight. Some refinery streams and, for example, Fischer Tropsch synthetic diesel fuel are essentially sulfur-free—but when distributed in the fuel infrastructure it is very difficult to consistently deliver fuels with a sulfur level of less than 30 ppm. In some regions of the world, commercial hydrocarbon fuels contain elevated levels of sulfur, e.g., in an amount of about 300 to about 5,000 ppm by weight. It is likely that these high sulfur fuels will continue to be used in some parts of the world and in some industries (for example shipping and aviation) for long into the future. Fuel cell stacks can be particularly sensitive to sulfur—which tends to accumulate in the anode and cut power density and efficiency. Reformer catalysts and washcoat materials may also have some sensitivity to sulfur. In addition, endothermic reformer catalysts operating at low temperature tend to be particularly intolerant to sulfur, which can also adversely affect achievable reformer efficiency. In addition, sulfur can increase the propensity to form soot and other carbonaceous deposits. If coking or sooting occurs, due to a premature gas phase reaction before the fuel enters the reformer, within the reformer or as a post reaction in the system manifolding, the resulting particulate matter can enter the SOFC and degrade its efficiency and performance. Thus the long term successful operation of the fuel cell system is compromised by sulfur in the fuel.

Pending U.S. patent application, Ser. No. 09/781,687, filed Feb. 12, 2001, published Sep. 26, 2002 as US Patent Application Publication No. 2002/0136936 A1, the relevant disclosure of which is incorporated herein by reference, discloses a system and method for trapping impurities and particulate matter, and especially sulfur and sulfur-containing compounds, in energy conversion devices. The system comprises a regenerable trap including a trap element and, optionally, a filter element. The reforming system is fluidly coupled to the trapping system, which is positioned after the reforming system.

A drawback of the disclosed trappng system is that when the trap becomes loaded with trapped material, fuel cell operation must be suspended in order for the trap to be purged of the trapped material and thus regenerated. During such regeneration, the reformer is operated in a fashion to produce a gas suitable for removal of the trapped material (i.e., at high oxygen/carbon ratios) and the reformate gas is passed through the trap, reversing the adsorption process. The effluent from the trap is exhausted from the system via a control valve. A problem with this approach is that the fuel being reformed during regeneration is still contaminated with sulfur. Another problem is that the temperature at the reformer exit may be more than 900 C during start-up which can deteriorate the active materials in the sulfur trap. Yet another problem is that an extra heat exchanger must be used upstream of the reformer to cool recycled anode gas when the recycled gas is used to provide an oxidant for endothermic reforming.

What is needed in the art is a method and apparatus that permits continuous supply of desulfurized reformate to a fuel cell while simultaneously permitting regeneration of the sulfur strap, in an efficient configuration that protects the active materials in the sulfur trap from high temperature modes.

It is a principal object of the present invention to provide a continuous stream of sulfur-free reformate to a fuel cell for continuous operation thereof.

SUMMARY OF THE INVENTION

Briefly described, a system for removing sulfur from a continuous reformate stream comprises first and second regenerable sulfur traps disposed in parallel between a hydrocarbon reformer and a fuel cell assembly. The ends of the sulfur traps are connected to conventional four-way valves such that either trap may be selected for trapping sulfur from the reformate stream, while the other trap is undergoing regeneration by purging out the accumulated sulfur deposits. Thus, the sulfur traps may be loaded and purged alternately, permitting continuous supply of reformate to the fuel cell assembly. In a currently preferred embodiment, selected amounts of hot cathode air exhaust, hot anode gas exhaust and/or steam are used to control the temperature and oxygen concentration in the out-of-service trap, in order to assist in purging and thus regenerating the out-of-service trap. The timing of the adsorption/regeneration modes may be controlled so that regeneration occurs faster than adsorption to assure complete purging of sulfur before the trap is returned to its adsorption mode. In an alternate embodiment, a second reformer is disposed parallel to the first reformer and in series with the second regenerable sulfur trap so that the reformers may also be sequentially regenerated along with the associated sulfur traps. In a preferred embodiment, additional amounts of anode exhaust from the stack may be added to the stream between the regenerating trap and regenerating reformer to further reduce the amount of free oxygen flowing to the reformer to improve reformer regeneration. Alternatively, the amount of cathode exhaust flowing to the regenerating reformer from the regenerating sulfur trap may be reduced or completely switched off to control the temperature of and the oxygen concentration in the regenerating reformer.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
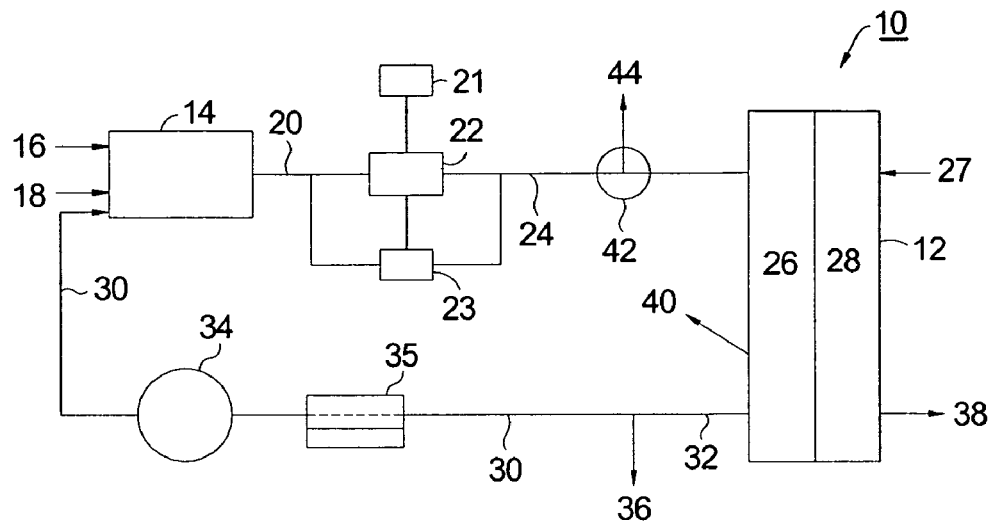
FIG. 1 is a schematic drawing of a prior art system for desulfurizing a reformate stream, substantially as disclosed in the incorporated US Patent Application Publication reference, also showing an optional anode recycle loop for thermal reforming.

Referring to FIG. 1, a prior art system 10 includes a fuel cell stack 12, preferably a solid oxide fuel cell (SOFC) stack as is known in the art, although an apparatus in accordance with the invention is also useful for use with other types of fuel cell systems, for example, a molten carbonate fuel cell (MCFC) (not shown). A catalytic hydrocarbon reformer 14 receives a hydrocarbon fuel 16 and optionally air 18 and expels a reformate stream 20. Fuel 16 is preferably selected from the group consisting of, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, combinations comprising at least one of the foregoing methods, and the like; and combinations comprising at least one of the foregoing fuels. A sulfur-adsorptive, regenerable trap 22 containing suitable materials, preferably as disclosed in the incorporated reference or containing a high surface area, nanostructured sorbent of relatively low capacity, adsorptively retains sulfurous compounds passing through trap 22, for example, hydrogen sulfide ($H_2S$) and sulfur dioxide ($SO_2$) as may be present in stream 20.

In a currently preferred embodiment, trap 22 includes a filter element and a trap element. The filter element includes a particulate filter in the first chamber of the trapping system wherein the particulate filter includes a washcoat disposed on the filter material.

Various sensors such as, for example, temperature sensor 21 and/or pressure differential sensor 23 can be positioned in electrical communication with trap 22 to detect the sulfur level content of trap 22, and to control and schedule the trap's regeneration based on those levels. Trap 22 can then be regenerated by adjusting the air-fuel ratio of the reformate, or by increasing the operating temperature of the trap, as known in the art.

When in the fuel cell operation mode, Desulfurized stream 24 is passed into the anode side 26 of fuel cell stack 12 where it reacts with oxygen provided from air 27 on the cathode side 28 to produce electricity as is well known in the art. Optionally, after being cooled by heat exchanger 35, a portion 30 of anode exhaust 32 may be recirculated into reformer 14, assisted via a high-temperature, pressurized pump 34, to provide the oxidant for endothermic reforming; the balance 36 of anode exhaust 32 is disposed of in known fashion. Hot cathode exhaust air 38 is passed to atmosphere. Waste heat 40 from fuel cell stack 12 may be directed into reformer 14, for example, by proximity thereto, to assist in endothermic reforming.

Desulfurizing trap 22 requires periodic regeneration as described in the incorporated reference. A three-way valve 42 downstream of trap 22, after receiving a control signal from various monitoring sensors such as sensors 21,23, permits the venting of desorbed sulfurous materials to a suitable destination 44 when regeneration is required and SOFC 12 may be taken offline.

Figure 2:
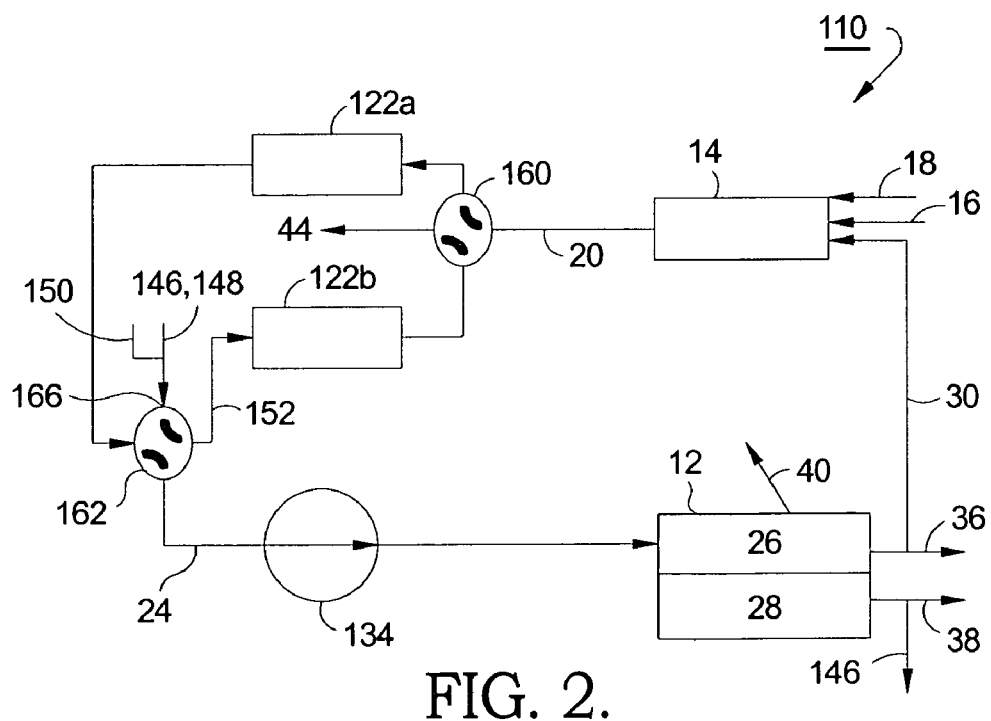
FIG. 2 is a schematic diagram of a first embodiment of an improved apparatus in accordance with the invention for desulfurizing a reformate stream while providing a continuous stream of desulfurized reformate to a fuel cell assembly.

Referring to FIG. 2, a first embodiment 110 in accordance with the invention, like prior art embodiment 10, comprises a fuel cell stack 12, having anode side 26 and cathode side 28, and a reformer 14 for receiving fuel 16 and air 18, and a portion of recycled anode gas 30, as may be needed for generating a reformate stream 20. The improvement in first embodiment 110 is the provision of first and second equivalent regenerable traps 122a, 122b arranged in parallel flow. Each of traps 122a, 122b may be constructed of a trap element, and optionally a filter element, as disclosed in the incorporated reference. A first four-way valve 160 and a second four-way valve 162 are connected across the respective entrances and exits of traps 122a, 122b as shown in FIG. 2 such that reformate stream 20 may be directed as desired alternately through either trap 122a or trap 122b as desulfurized stream 24.

The arrangement shown in FIG. 2 permits reformate stream 20 and desulfurized stream 24 to be directed into fuel cell stack 12 continuously by the selection of either trap 122a or trap 122b. Likewise, this arrangement permits the offline regeneration of the traps preferably in a direction counter to the flow of reformate, of whichever trap is not in service. As shown in a first operating mode in FIG. 2, trap 122a is selected for online reformate flow and trap 122b is offline. To change to a second and alternate operating mode, actuation of valves 160, 162 serves to bring trap 122b online and places trap 122a offline.

In the first operating mode, as shown in FIG. 2, all or a portion 146 of hot, oxygen-depleted cathode exhaust 38 may be sent to offline trap 122b via a backflush inlet 166 of valve 162 to permit reverse-flow regeneration of the offline trap to appropriate waste destination 44. Other gases 148 may be supplied to valve 162 as desired, either with or instead of cathode exhaust portion 146, for example a mixture or all or part of the cathode exhaust 38 and part of the anode exhaust 36 and optionally including steam 150 as a means to control temperature and oxygen concentration of gas 152 for trap regeneration.

In operation, the valves are switched periodically so that the just-regenerated trap now receives reformate and the saturated trap may be regenerated. The regeneration period of the storage and regeneration can be relatively short, for example, less than one minute for conditions wherein the temperatures of storage and regeneration are approximately equal, and several minutes if the temperatures are substantially different. The system is balanced so that offline regeneration occurs somewhat faster than online adsorption. In this way, the traps are completely purged of sulfur prior to being placed back online with the stack. This timing is easily achieved with choice of appropriate adsorbent materials, regenerating gases, and temperatures, as known in the art. Preferably, the proportions of gases 146,148, during the regeneration, are adjusted so that when the trap is placed back online to the fuel cell stack, no oxygen is present in the stream. For example the flow of cathode exhaust 146 to valve 162, containing amounts of oxygen, can be switched off and steam or anode exhaust contained in the regeneration gas 152 can remain flowing at the end of the regeneration cycle—such that no free oxygen reaches the fuel cell stack 12 in the fuel gas and, optionally, so that the surface of active materials in the traps 122a/b can be reduced.

The state of the traps 122a, 122b can be continuously monitored by differential pressure, temperature, and inlet and exhaust gas composition sensors, such as sensors shown in FIG. 1 as 21,23, together with predetermined control algorithms.

Figure 3:
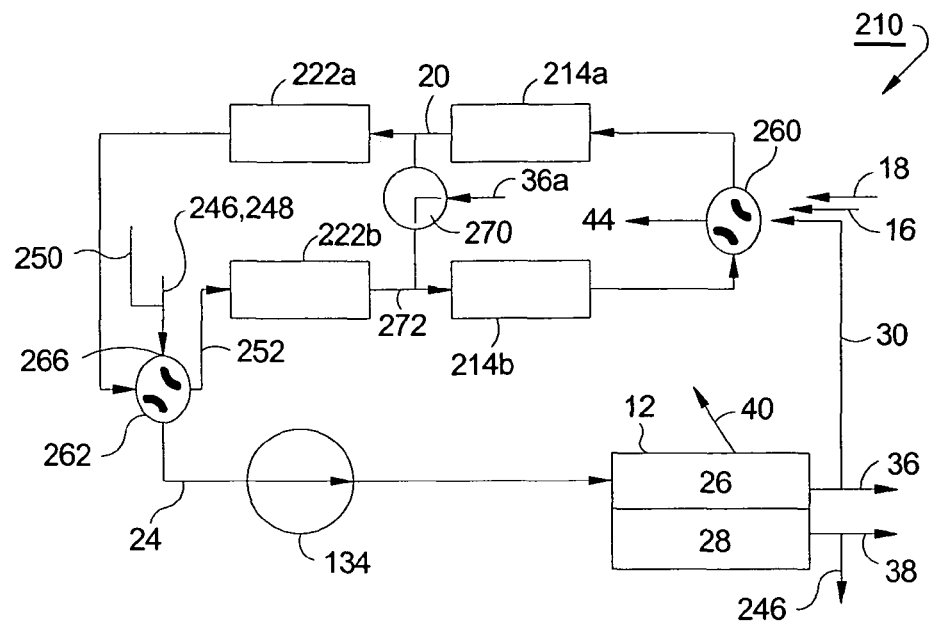
FIG. 3 is a schematic diagram of a second embodiment of an improved apparatus in accordance with the invention.

Referring now to FIG. 3, a second embodiment 210 in accordance with the invention includes first and second traps 222a,222b, first and second four-way valves 260,262, and a fuel cell stack 12. The novel feature of embodiment 210 is that two alternate reformers 214a,214b are also provided in parallel and are included in the changeable pathway between the four-way valves 260,262. Thus, not only the traps but also the reformer catalysts and catalyst substrates may be backflushed of contaminants during regeneration mode.

In the first operating mode as shown in FIG. 3, all or a portion 246 of hot, oxygen-depleted gas from cathode exhaust 38 may be sent to the offline trap and reformer via a backflush inlet 266 of valve 262 to permit reverse-flow regeneration of the offline trap and reformer to appropriate waste destination 44. Other gases 248 may be supplied to valve 262 as desired, either with or instead of cathode exhaust portion 246, for example a mixture of all or part of the cathode exhaust 38 and part of the anode exhaust 36 and optionally including steam 250 as a means to control the oxygen concentration of gas 252 for trap and reformer regeneration. This can be useful for systems using fully endothermic reforming at relatively low temperatures, because substantial storage of sulfur on the catalyst is a known source of deterioration that is desirably mitigated. Preferably, the amount of free oxygen flowing from the regenerating trap and into the regenerating reformer may be reduced by introducing additional amounts 36a of anode exhaust 36 via three-way valve 270.

Figure 4:
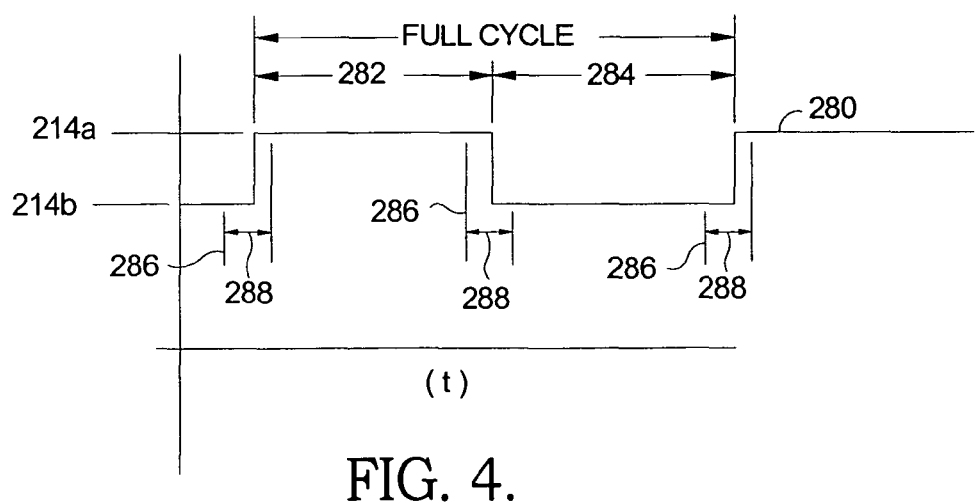
FIG. 4 is a graph showing the switching sequence of valves during the regeneration cycle of the second embodiment.

To prevent residual oxygen from migrating to the anode, from the regenerating cycle, near the end of the regeneration cycle, and before valves 260,262 switch to reverse the regeneration/adsorption modes, the flow of cathode exhaust portion 246 to valve 262 can be switched off and steam and/or anode exhaust can remain flowing to the leg being regenerated. Alternately, to consume any residual oxygen, the amount of anode exhaust 36a being introduced to the reformer via valve 270 may be adjusted to achieve a stoichiometric or richer fuel/air ratio entering regenerating reformer 214b near the end of the regenerating cycle. The timing of either introducing additional amounts of gas 36a or switching off the flow of exhaust portion 246 is best shown in FIG. 4. In FIG. 4, line 280 represents the period of time of the full cycle (t) over which either leg completes its reforming and regeneration cycle. During time interval 282, reformer 214a is in its regeneration period or cycle; during time interval 284, reformer 214b is in its regeneration period or cycle. As shown, near the end 286 of their respective cycles, purge phase 288 begins during which additional amounts of gas 36a are introduced into the respective reformer or the flow of cathode exhaust portion 246 is switched off. Preferably, the purge phase continues beyond the end of the regeneration cycle to minimize the amount of oxygen present in the reformer when reforming again begins.

The order and strategic placement of components in the first and second embodiments (FIGS. 2 and 3) to match or nearly match their optimal temperature of operation allows the components to operate at appropriate temperatures without the need for heat exchanger 35 and the use of a lower temperature recycle pump 134, as used in prior art system 10, thus offering a substantial reduction in weight, cost and complexity. For example, by placing reformer 14 downstream of and in thermal proximity of the stack and stack exhaust outlets, as shown, optimal, incrementally decreasing operating temperatures for the inlet and outlet of the stack of 650° C. and 850° C.; for the inlet and outlet of the reformer of 800° C. and 700° C.; for the inlet and outlet of the regenerable traps of 650° C. and 600° C.; and for the inlet to the pump, of 550° C. can be achieved.

Embodiment 110 is especially useful with low-sulfur fuels such as natural gas and low-sulfur gasoline. Embodiment 210 is especially useful with heavier fuels and high-sulfur fuels such as diesel fuels, JP8, or current jet fuel. This is because it is practical to make a robust endothermic reformer with light, low-sulfur fuels, but heavier and high-sulfur fuels tend to create problems with coking and contamination of the reforming catalysts; thus a periodic and frequent regeneration of the reformer catalyst is attractive.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system comprising:
   a) a fuel cell stack;
   b) a first catalytic hydrocarbon reformer for reforming a hydrocarbon fuel and thereby generating a stream of reformate for use in said fuel cell stack;
   c) first and second sulfur traps disposed in parallel flow downstream of said reformer for desulfurizing said stream of reformate;
   d) first and second selector valves fluidly coupled to said first and second sulfur traps for selecting between alternate flow paths therethrough for said reformate stream, said first selector valve being disposed in series flow with said reformate stream upstream of said first and second sulfur traps and said second selector valve being disposed in series flow with said reformate stream downstream of said first and second sulfur traps, and
   e) a second catalytic hydrocarbon reformer disposed in parallel with said first catalytic hydrocarbon reformer, wherein said first and second selector valves are configured such that when either one of said first and second sulfur traps is fluidly coupled to receive said reformate stream the other one of said first and second sulfur traps is fluidly coupled to receive a regenerating gas, wherein said second selector valve includes a backflush inlet configured to receive a stream of said regenerating gas and is disposed in said regenerating gas stream upstream of said other one of said first and second sulfur traps that is fluidly coupled to receive said regenerating gas, wherein said second selector valve is configured to provide a continuous stream of desulfurized reformate to said fuel cell stack, wherein said first sulfur trap is fluidly coupled to said first reformer and said second sulfur trap is fluidly coupled to said second catalytic hydrocarbon reformer, wherein said first selector valve is disposed upstream of and in flow connection with said first and second reformers such that each reformer is regenerated along with its respective trap, and wherein said fuel cell stack further produces a flow of spent anode gas and further including a third selector valve fluidly coupled upstream to said first and second catalytic hydrocarbon reformers for selecting between alternate flow paths therethrough for at least a portion of said spent anode gas.

* * * * *